(12) United States Patent
Pignataro et al.

(10) Patent No.: US 9,633,131 B2
(45) Date of Patent: Apr. 25, 2017

(54) HTML NETWORK SERVICE TAGS USED WITH WEB BROWSERS FOR CONTROLLING NETWORK ELEMENTS

(71) Applicant: Cisco Technology, Inc., San Jose, CA (US)

(72) Inventors: Carlos M. Pignataro, Raleigh, NC (US); Nitesh Trikha, Union City, CA (US); William N. Dry, Raleigh, NC (US); Gonzalo A. Salgueiro, Raleigh, NC (US); Pankaj Srivastava, Belmont, CA (US)

(73) Assignee: Cisco Technology, Inc., San Jose, CA (US)

( * ) Notice: Subject to any disclaimer, the term of this patent is extended or adjusted under 35 U.S.C. 154(b) by 474 days.

(21) Appl. No.: 14/204,126

(22) Filed: Mar. 11, 2014

(65) Prior Publication Data
US 2015/0261875 A1 Sep. 17, 2015

(51) Int. Cl.
*G06F 17/30* (2006.01)
*H04L 29/08* (2006.01)
*H04L 12/24* (2006.01)

(52) U.S. Cl.
CPC .... *G06F 17/30896* (2013.01); *H04L 41/0266* (2013.01); *H04L 67/025* (2013.01)

(58) Field of Classification Search
CPC ........... G06F 17/30896; H04L 41/0266; H04L 67/025
USPC ........................................................ 709/223
See application file for complete search history.

(56) References Cited

U.S. PATENT DOCUMENTS

| 8,782,230 | B1* | 7/2014 | Swedor | H04L 41/0266 709/226 |
| 2005/0160358 | A1* | 7/2005 | Gumz | G06F 9/44526 715/234 |
| 2006/0031544 | A1 | 2/2006 | Dirstine | |
| 2006/0190575 | A1 | 8/2006 | Harvey et al. | |
| 2007/0288558 | A1 | 12/2007 | Land et al. | |
| 2010/0031168 | A1* | 2/2010 | Loriedo | G06F 17/30896 715/760 |
| 2013/0041997 | A1 | 2/2013 | Li et al. | |

(Continued)

OTHER PUBLICATIONS

W3C, HTML 5 Working Draft, Jan. 22, 2008, p. 1 (1 Page).*

(Continued)

*Primary Examiner* — Wing F Chan
*Assistant Examiner* — Leon Y Tseng
(74) *Attorney, Agent, or Firm* — Edell, Shapiro & Finnan, LLC (57) ABSTRACT

A web browser configured to execute on a network element receives a Hypertext Markup Language (HTML) document including HTML network service tags. The network service tags include commands to cause a corresponding network action to be taken in connection with the network element, such as configuring and/or causing information to be read from the network element. The web browser determines, based on each HTML network service tag, the command to cause the network action to be taken in connection with the network element. The web browser issues the determined command for each HTML network service tag to a corresponding application program interface (API), which in turn cause the network action to be taken in connection with the network element.

23 Claims, 7 Drawing Sheets

```
504
    <network>         506
        <node n type ="router">
508 —— <connect c protocol="ssh" username="root" password="cisco123" port="23">
510 ——   var logs = c.collectlogs (n, "runtime-config");
512 ——   var version = log.getElementbyID ("Version");
         <p>
514 ——       document.write ("The Runtime Config OS Version on router is:" + version);
         </p>
        </connect>
    </node>
</network>
```

500

(56) References Cited

U.S. PATENT DOCUMENTS

| | | | |
|---|---|---|---|
| 2013/0173621 A1 | 7/2013 | Kapoor et al. | |
| 2013/0182712 A1* | 7/2013 | Aguayo | H04L 12/4633 |
| | | | 370/395.53 |
| 2013/0304264 A1 | 11/2013 | Shao | |
| 2014/0052976 A1* | 2/2014 | Marino | G06F 21/56 |
| | | | 713/2 |

OTHER PUBLICATIONS

Cooney et al., Introduction to Web Components, W3C Working Draft, Jun. 6, 2013, www.w3.org (20 pages).*

Michael Compton et al., "Semantic Sensor Network Incubator Group Charter", May 21, 2010, http://www.w3.org/2005/Incubator/ssn/charter.

Open Geospatial Consortium, "OGC White Paper—OGC® Sensor Web Enablement: Overview and High Level Architecture", Apr. 2, 2013, 17 Pages.

International Search Report and Written Opinion in counterpart International Application No. PCT/US2015/019627, mailed Jun. 11, 2015, 10 pages.

* cited by examiner

```
<network>
  <node n type ="router">
    <connect c protocol="ssh" username="root" password="cisco123" port="23">
      var logs = c.collectlogs (n, "runtime-config");
      var version = log.getElementbyID ("Version");
      <p>
        document.write ("The Runtime Config OS Version on router is:" + version);
      </p>
    </connect>
  </node>
</network>
```

HTML NETWORK SERVICE TAGS USED WITH WEB BROWSERS FOR CONTROLLING NETWORK ELEMENTS

TECHNICAL FIELD

The present disclosure relates to controlling browser-enabled network elements using HTML network service tags.

BACKGROUND

Data networks include network elements, such as network routers and switches, to forward data packets in the networks. Increasingly, web programmers use network support tools and services, such as software defined network (SDN) applications, to define and configure the data networks, including the network elements. Network programming languages related to the suite of Hypertext Markup Language (HTML) standards have evolved into powerful web programming tools useful for constructing web pages, navigating the Internet, and the like, but fail to empower web programmers with an efficient way to configure, control, and manage network elements in the Internet.

DESCRIPTION OF EXAMPLE EMBODIMENTS

Overview

Techniques presented herein use Hypertext Markup Language (HTML) network service tags embedded in an HTML document or other HTML applications with web browser enabled network elements to control and manage control plane and data plane features of the network elements. According to these techniques, a web browser is configured to execute on a controller of a network element and communicate with a set of application program interfaces (APIs) that provide access to controllable data and control plane features of the network element. The web browser receives an HTML document including HTML network service tags. Each of the network service tags includes a command to cause a corresponding network action to be taken in connection with the network element, e.g., a network action on the data or control plane features. The network action may include reading information from the network element and returning the read information to the web browser. The web browser determines, based on each HTML network service tag, the command to cause the network action to be taken. The web browser issues the determined command for each HTML network service tag to a corresponding one of the APIs, which in turn cause the network action to be taken in connection with the network element.

Example Embodiments

Figure 1:
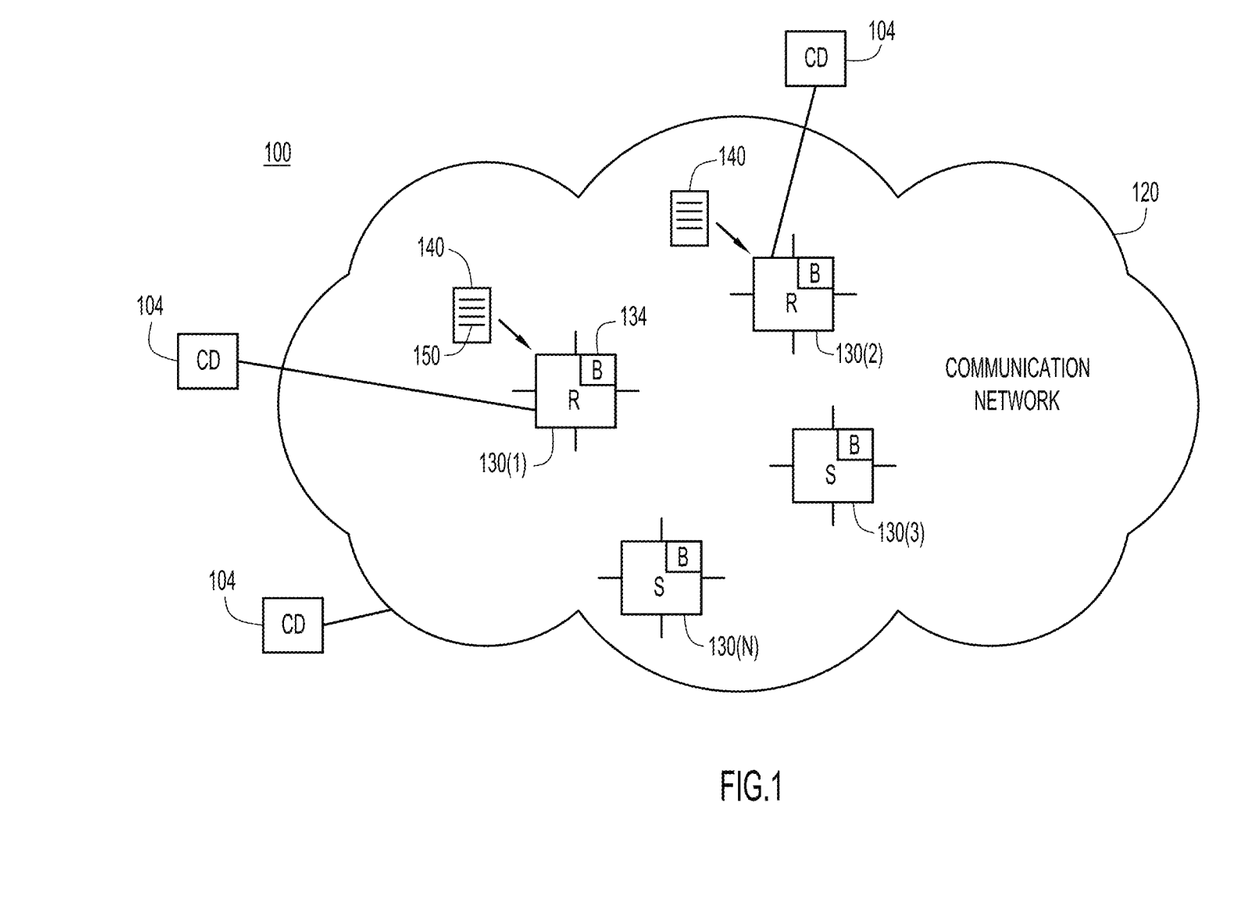
FIG. 1 is a block diagram of a network environment in which Hypertext Markup Language (HTML) network service tags may be used to control browser-enabled network elements, such as routers and switches.

FIG. 1 is a block diagram of a network environment 100 in which techniques presented herein may be implemented. Network environment 100 includes multiple client devices (CDs) 104 that communicate wirelessly and/or through wired connections with a communication network 120. Communication network 120 may include one or more wide area networks (WANs), such as the Internet, and one or more local area networks (LANs). The WANs and LANs include wired and wireless networks. Communication network 120 also includes multiple network elements 130(1) to 130(N) (collectively referred to as network elements 130) to forward data packets in communication network 120. Network elements 130 include network switches (denoted with an "S") and network routers (denoted with an "R"). The switches S and routers R may function in their respective networks as Gateway routers and local mobile anchors (LMAs), for example.

Network elements 130 are each browser-enabled, meaning that the network elements each host a web browser ("B") 134 configured to receive and interpret web documents 140, such as Hypertext Markup Language (HTML) formatted documents. Web documents 140 may be generated by applications external to network elements 130 and sent to the network elements. Alternatively, and/or additionally, the applications that generate web documents 140 may be hosted on network elements 130 and integrated with the local browser 134, for example. According to techniques described herein, the HTML documents may be formatted to include network service tags 150 (referred to simply as "service tags" 150) intended to control and configure network elements 130. Service tags 150 follow a format similar to other HTML tags used for web navigation and display, but the service tags are directed to control of networking features of the network element. Browsers 134 hosted on network elements 130 are configured to deconstruct (i.e., parse and interpret) service tags 150 into corresponding application programming commands (API) commands to control the network elements.

Browsers 134 process service tags 150 to cause network elements 130 to perform actions in support of the following activities related to managing and controlling network elements:
  a. discovery;
  b. application-based provisioning and configuration;
  c. device status collection;
  d. notification;
  e. network telemetry collection, monitoring, troubleshooting and forensic data collection;
  f. network analytics and management; and
  g. implementation of standard, ubiquitous application-level communications.

Figure 2:
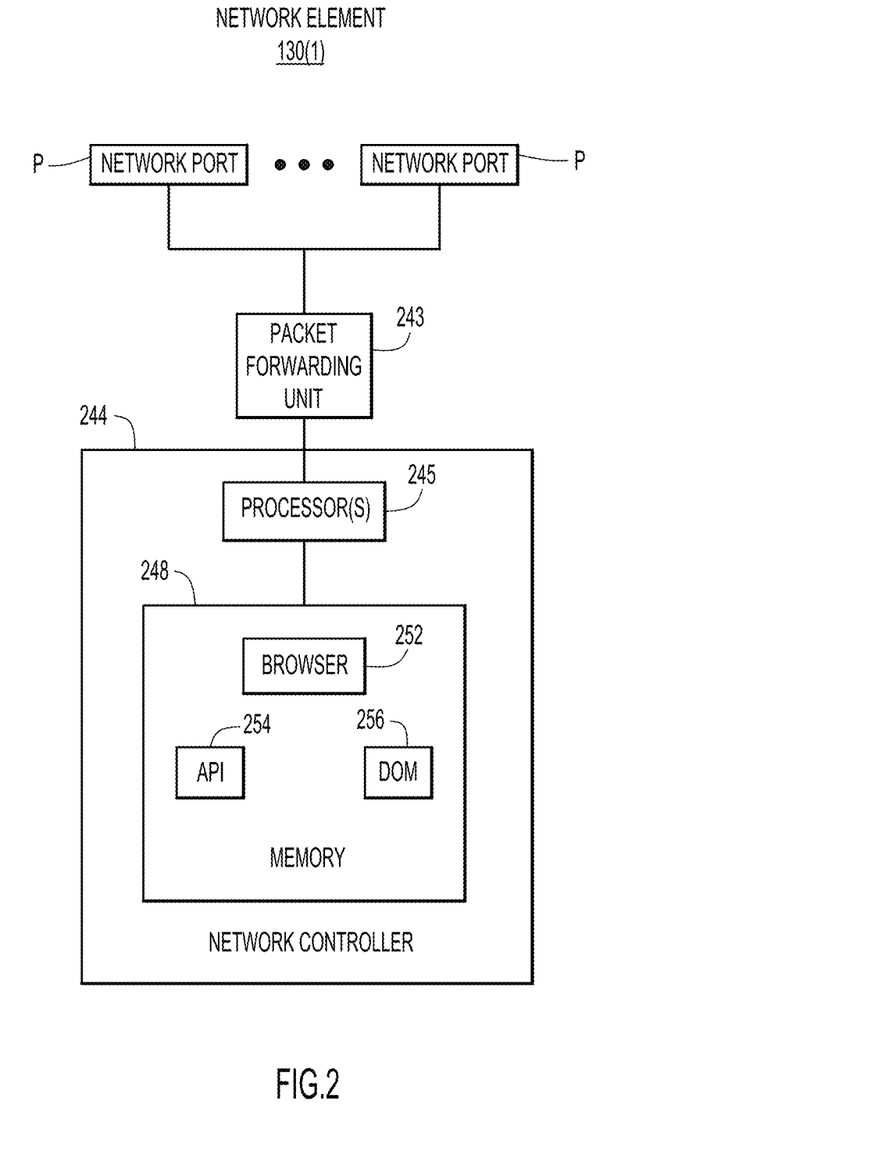
FIG. 2 is an example block diagram of a browser-enabled network element in the network environment of FIG. 1.

Reference is now made to FIG. 2, which shows an example block diagram of network element 130(1) (and also of the other network elements 130(2) through 130(N)) configured to perform the operations described herein. There are numerous possible configurations for network element 130(1) and FIG. 2 is meant to be an example. In one embodiment network element 130(1) is a network router and in another embodiment network element 130(1) is a network switch. In either embodiment, network element 130(1) has packet forwarding capabilities as well as computing/data processing capabilities. To this end, network element 130(1) includes a packet forwarding unit 243 coupled with a plurality of network ports P (which may including wired and wireless ports), and a controller 244 having a processor 245 (or multiple processors) and memory 248. The processor 245 is a microcontroller or microprocessor, for example, configured to execute software instructions stored in the memory 248.

The memory 248 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 248 may comprise one or more computer readable storage media (e.g., a memory device) encoded with software comprising computer executable instructions and when the software is executed (by the processor 245) it is operable to perform the operations described herein.

For example, the memory 248 stores or is encoded with instructions for a web browser 252 (corresponding to an instance of one of web browsers 134 (B) in FIG. 1) to implement web browser operations responsive to received HTML documents 140 with embedded network service tags 150, and APIs 254 through which the Web Browser may communicate with and control network features/components in a data plane and a control plane of network element 130(1). APIs 254 may be embedded in web browser 252. In addition, memory 248 stores data generated and used by web browser 252, including a Network Device Object Model (DOM) 256 that models HTML service tags relevant to, i.e., that may cause actions on, network element 130(1). In an embodiment, web browser 252 may be a displayless or windowless browser. In another embodiment, web browser may be a display/window-enabled browser. Note that web browser 252 may be regarded as an API itself, in which case APIs 254 depicted in FIG. 2 are APIs other than the web browser API.

Figure 3:
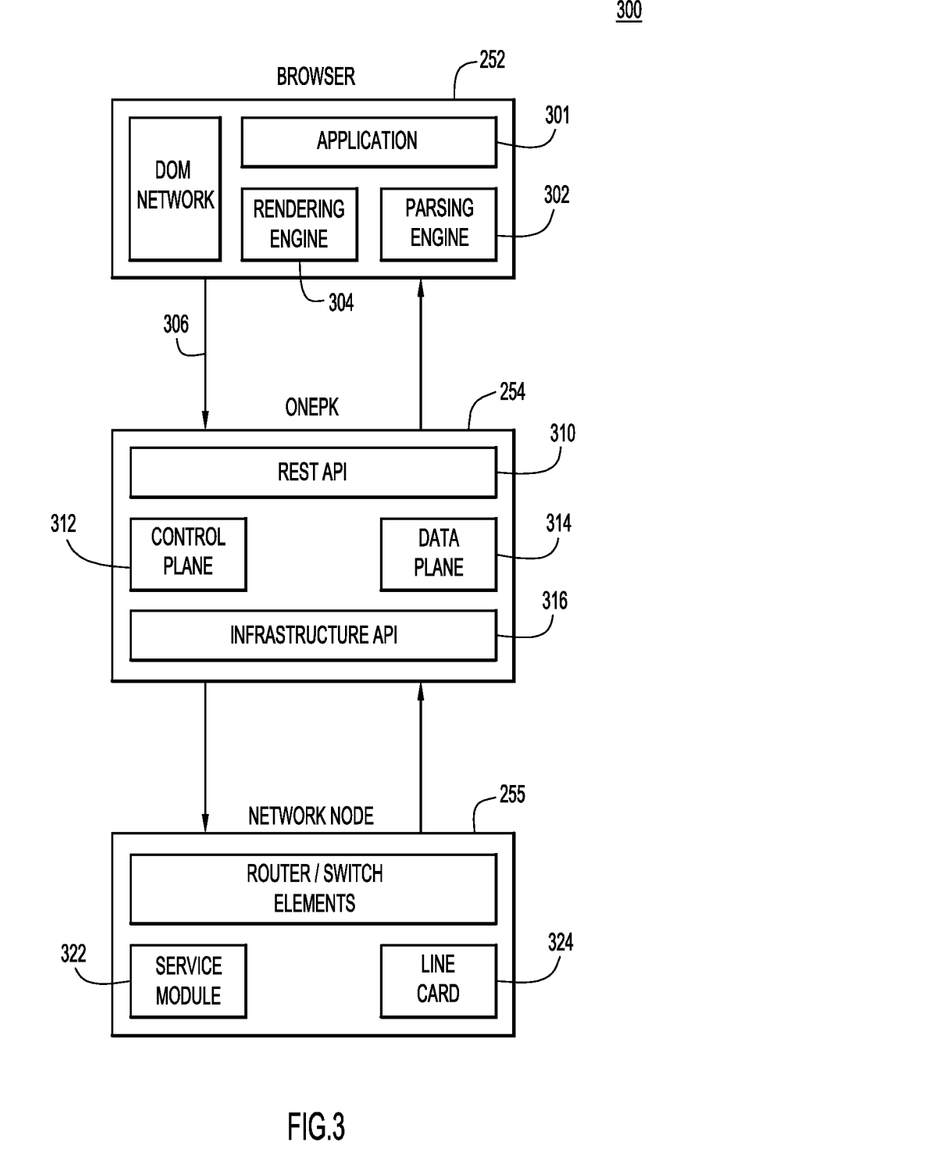
FIG. 3 is depicted an interaction diagram that shows high-level interactions between various components of the network element of FIG. 2 associated with the use of HTML network service tags.

With reference to FIG. 3, there is depicted an interaction diagram 300 that shows high-level interactions between various architectural components of network element 130(1) depicted in FIG. 2. As depicted in FIG. 3, web browser 252 includes a browser application 301, a parsing engine 303 to parse HTML documents 140 with embedded service tags 150, and a rendering engine 304 to interpret the parsed HTML documents and send network element control commands 306 deconstructed from the service tags to APIs 254. Browser engines 302 and 304 perform their respective functions based on entries in network DOM 256.

In one embodiment, APIs 254 are implemented as an instance of OnePK (One Platform Kit) by Cisco Systems, Inc. OnePK APIs are software definable APIs used for software defined networks (SDNs). APIs 254 include a Representational State Transfer (REST) API 310 to provide a stateless communication interface with browser 252, and control plane and data plane APIs 312 and 314, respectively, that interface with controllable control plane and data plane features/components of network element 130(1) through an infrastructure API 316, which interfaces directly with the network features/components of network element 130(1).

Infrastructure API 316 interfaces with the physical network/network-node layer functions 255 (also referred to as "network node" 255) of network element 130(1), such as a service module function 322 and line card function 324 of network element 130(1).

Figure 4:
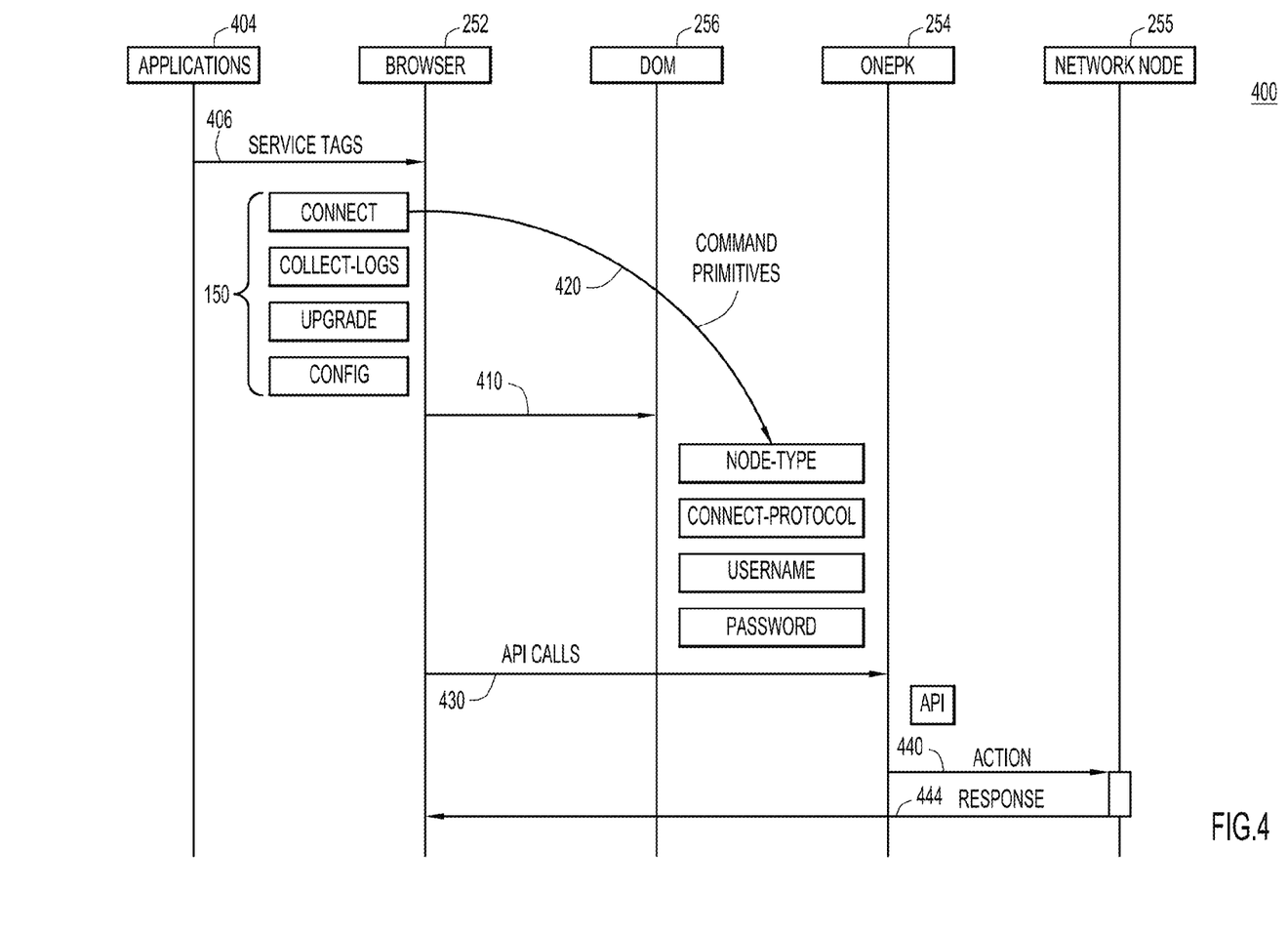
FIG. 4 is an example HTML network service tag sequence diagram that shows communications between the various components linked together in the interaction diagram of FIG. 3.

With reference to FIG. 4, there is depicted an example HTML network service tag sequence diagram 400 that shows communications between the various layers linked together in FIG. 3, namely, browser 252, DOM 256, APIs 254 (implemented in OnePK, for example), and network node 255 and applications 404.

At 406, the applications layer 404 sends one or more HTML network service tags 150 to the browser. In an embodiment, the HTML documents are formatted according to HTML5 and the network service tags are provided as custom defined HTML5 tags. In other words, the HTML5 network service tags are a custom extension of the HTML5 format standard. In this embodiment, browser 252 is configured to interpret HTML5 formatted language and the HTML5 network service tags.

Applications 404 use service tags 150 to cause operations to be performed on one or more of network elements 130. In the example of FIG. 4, the service tags may include any of the following commands:
  a. Connect—initiates a session request to a network object or service on a network element. Browser 252 uses DOM 256 to deconstruct the Connect into functional components used to establish a communication session. The functional components include:
    1. Node-Type—Category of physical or virtual device on the network element which has a distinct set of communication interfaces;
    2. Connect Protocol—Method of connection establishment and information exchange;
    3. Username—Identifier of the person or object establishing the connection; and
    4. Password—Secret code used with the identifier to validate the right to establish a connection to a particular object or service on the network element;
  b. Collect-Logs—request to retrieve a specified type of text-based device output from a particular object or service on the network element;
  c. Upgrade—change the software or firmware for a specific device or device component on the network element; and
  d. Config—request to update or change the current or future state parameters of a device or device component on the network element;
  e. Discover-Network—discover the network element;
  f. Create-Network Node—create a network node;
  g. Start-Collaboration—start a collaboration with the network element; and
  h. Get-Analytics-Data—cause the network element to send analytical data.

At 410, browser 252 accesses DOM 256 and uses it to deconstruct the service tags into command primitives 420. In the example of FIG. 4, the service tag for Connect is deconstructed into command primitives node-type, connect-protocol, username, and password.

At 430, browser 252 constructs and makes RESTful API calls (to OnePK APIs 254) corresponding to the command primitives 420. In response, OnePK APIs 254 translate the RESTful API calls into network element/device specific API syntax, i.e., into commands that can be understood by the network features of the network element.

At 440, OnePK APIs 254 forward the translated API commands to network node 255 to cause network functions of the network node to perform the desired action.

At 444, OnePK APIs 254 receive a respond from the network functions, package the received response into RESTful syntax, and return the packaged response to the browser 252.

Figure 5:
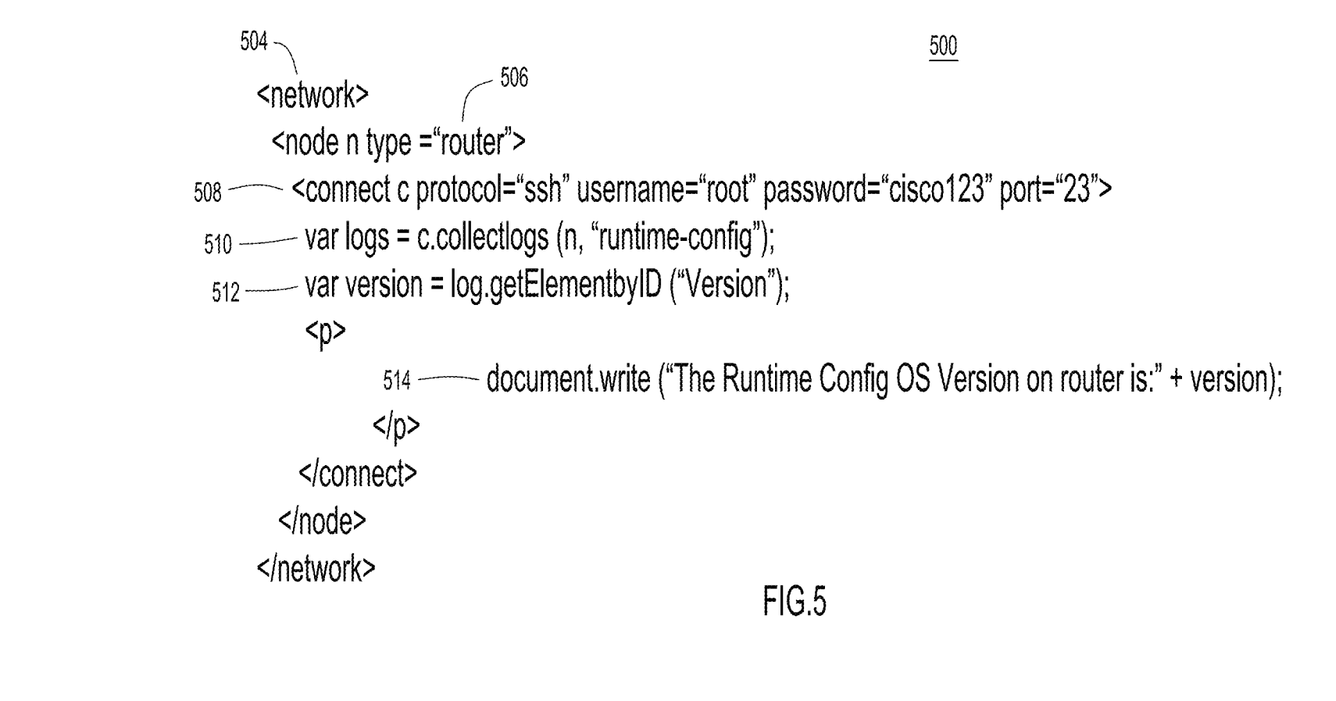
FIG. 5 is an illustration of an example HTML service tag for a Connect command/service.

With reference to FIG. 5, there is depicted an example HTML service tag 500 for Connect, referred to above in connection with FIG. 4. Connect service tag 500 includes a high-level tag descriptor 504 <network> indicating a tag category of network service tag, which will need to be interpreted using a network DOM (e.g., DOM 256). A next descriptor 506 <router> indicates the targeted network element is a router and is a command primitive of the network service tag 500. A next descriptor 508 indicates further command primitives associated with the Connect service tag. A next descriptor 510 "c.collectlogs" indicates that runtime configuration logs are to be collected (returned), and a descriptor 512 indicates a version identifier is also to be collected. The collected/returned version identifier is output in accordance with a write format descriptor 514. Descriptors 506-514 may be considered tag attributes that define the intended operations/functions/actions of tag 500.

Figure 6:
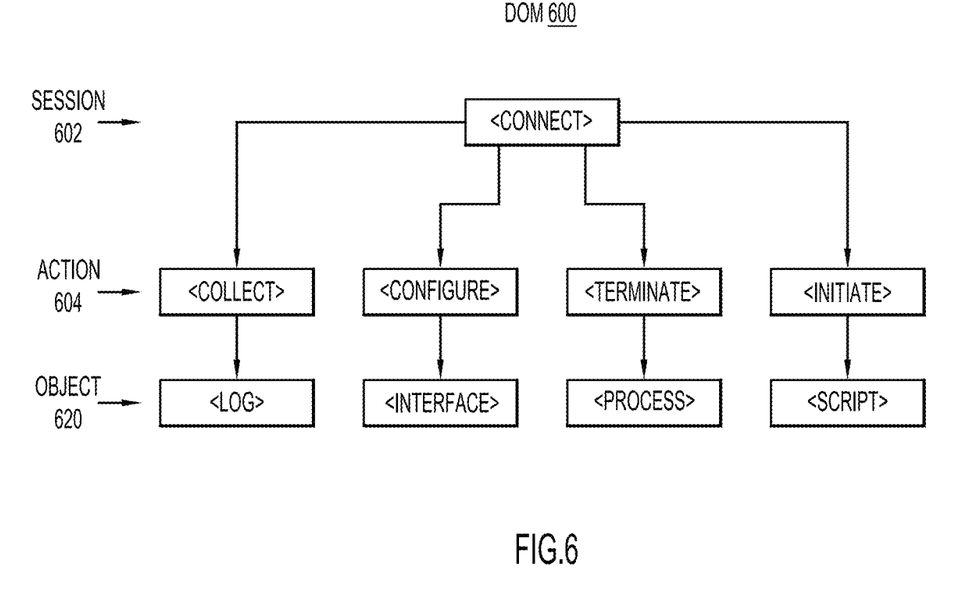
FIG. 6 is a block diagram of an example network device object model (DOM) used by a web browser to interpret and deconstruct HTML network service tags into command primitives.

With reference to FIG. 6, there is depicted an example network DOM 600 corresponding to DOM 256. Network DOM 600 represents in a tree structure each high-level network service tag command, its attributes, and its command primitives as objects, and also defines hierarchical relationships between the objects. In the example of FIG. 6, network DOM 600 includes a top-level or session construct 602 <Connect> corresponding to the Connect service tag. DOM 600 includes Action constructs 604, including <Collect>, <Configure>, <Terminate>, and <Initiate>. DOM 600 also includes Object constructs 620, including <Log>, <Interface>, <Process>, and <Script>. According to DOM 600, the action <Collect> operates on the object <Log>, i.e., the action collects logs. Similarly, the action <Terminate> acts on the object <Process>, i.e., the action terminates the process, and so on.

Figure 7:
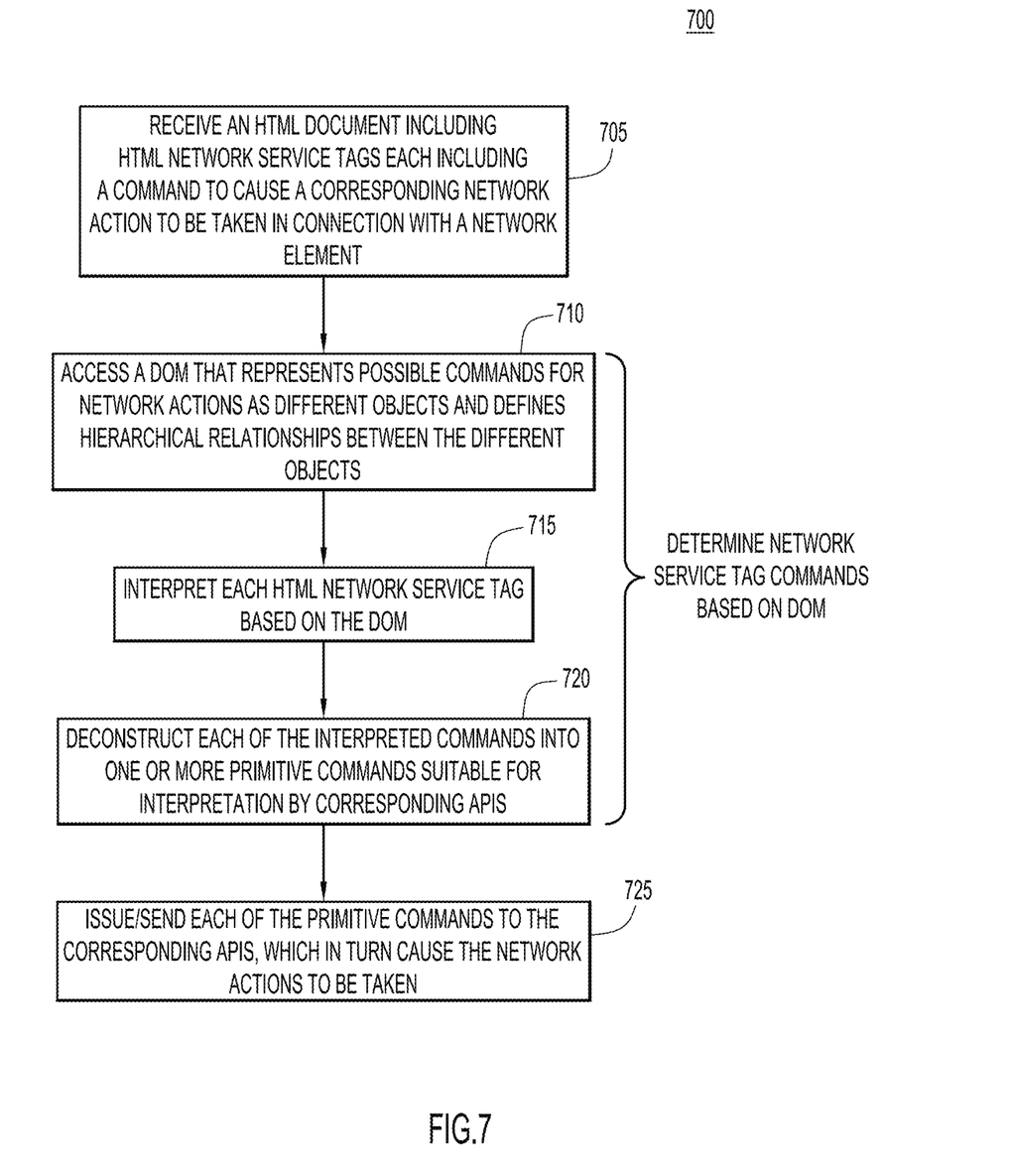
FIG. 7 is a flowchart of an example high-level method of using HTML network tags with a web browser to control a network element.

FIG. 7 is a flowchart of an example high-level method 700 of using HTML network tags 150 with web browser 252 to control network element 130. The method is performed by web browser 252 using DOM 256. Reference can be made to FIGS. 3-6 for purposes of the description of FIG. 7.

At 705, web browser 252 receives HTML document 140 including HTML network service tags 150, each including a command to cause a corresponding network action to be taken in connection with the network element. The commands may cause a specific action on network element 130, and may include query-response commands to cause information to be read from the network element and returned to web browser 252.

In next operations 710, 715, and 720, web browser 252 determines the commands associated with each of network service tags 150.

At 710, web browser 252 accesses DOM 256 that represents possible commands for network actions as different objects and defines hierarchical relationships between the different objects.

At 715, web browser 252 interprets each of HTML network service tag 150 based on DOM 256.

At 720, web browser 252 deconstructs each of the interpreted commands into one or more primitive commands suitable for interpretation by corresponding ones of APIs 254.

At 725, web browser 252 issues/sends each of the primitive commands to the corresponding one of the APIs, which in turn causes the corresponding, commanded, network action to be taken.

Techniques described herein expand the scope of an HTML browser, such as an HTML5 browser, so that it can be used as a valuable framework for controlling network elements. The techniques introduce network-based HTML5 support of network elements through the use of network service tags. The service tags make available to network elements standardized web protocols, architectures, query-response processing, APIs surfaces and script interaction interfaces. This offers a powerful and flexible application layer framework, particularly when applied to a set of network elements, such as routers and switches, including wireless embodiments thereof. The service tags allow applications to connect to network elements, collect telemetry data from the network elements, as well as configure the network elements as application-driven event policy configurations tied to network configurations as extensions to SDN and OnePK APIs.

The technique extends the HTML5 layer from application rendering and processing to embeddable network element modeling using HTML5, which allows applications to service and support a communication network via rich & intuitive user-experience applications across diverse platforms that deliver industry standardized and consistent experience and features.

Techniques described herein may implemented in a displayless web browser hosted on a network element, leverages new HTML architectural constructs like Web Components to introduce custom elements natively to a DOM tree.

The technique introduces the network service tag as a top-level custom tag (<network>) for use by network elements in a network service and support context by network elements. An example of such a tag follows:

---

HTML5 Tag: <network>
   Attributes:
      connect (port, username, password)
      collect (network-node-id, data-type [Enum: logs, runtime-config, system-config], filter:string)
      config (network-node-id, policy-id)
      apply-config (network-node-id, policy-id)
      upgrade (network-node-id, url-to-image)
      discover-network (network-node-id)
      create-network-node (node-type [Enum: router, switch, port])
      start-collaboration
      get-analytics-data

---

The techniques enable network elements to be queried (via the HTML service tags) using standard Hypertext Transfer Protocol (HTTP) information discovery methods over a secure transport. The ability to tap into an HTML5 paradigm on displayless full featured browser-enabled network elements via the network service tags also allows for web applications to provision and execute using new bi-directional access mechanisms like Websockets.

The techniques may be used in wireless devices, and on the edges of a network. In other words, an edge networking device and a wireless network element, may serve as proxies for the network service tags. This opens-up network analytics and management to web programmers and application developers by defining HTML5 custom tags (i.e., the network service tags) that are contextually relevant to network elements, namely that can provide access, configuration, information discovery and analytics within a ubiquitous API-driven and standards-based web-paradigm to network elements.

These techniques provides an open and well-defined API surface to interact bi-directionally with networking elements, permits querying of network elements through standard web-based information discovery protocols (e.g., Webfinger), allows for gathering of analytics and "Web-Analytics" for network elements and industry solutions, and leverages browser paradigms with networking devices, binds with SDN and OnePK APIs to further provide network support services to web programmers.

In summary, in one form, a method is provided, comprising: at a web browser configured to execute on a controller of a network element, wherein the network element is configured to operate as a network router or a network switch, the web browser further configured to communicate with a set of application program interfaces (APIs) that provide access to controllable data and control plane features of the network element: receiving a Hypertext Markup Language (HTML) document including HTML network service tags each including a command to cause a corresponding network action to be taken in connection with the network element; determining based on each HTML network service tag the command to cause the network action to be taken in connection with the network element; and issuing the determined command for each HTML network service tag to a corresponding one of the APIs, which in turn cause the network action to be taken in connection with the network element.

In another form, an apparatus is provided, comprising: a plurality of ports of a network element that is configured to operate as a network router or a network switch, the plurality of ports configured to send and receive data packets over a network; and a processor of the network element coupled to the plurality of ports and configured to: execute a web browser configured to communicate with a set of application program interfaces (APIs) that provide access to controllable data and control plane features of the network element; receive, by the web browser, a Hypertext Markup Language (HTML) document including HTML network service tags each including a command to cause a corresponding network action to be taken in connection with the network element; determine, by the web browser, based on each HTML network service tag the command to cause the network action to be taken in connection with the network element; and issue, by the web browser, the determined command for each HTML network service tag to a corresponding one of the APIs, which in turn cause the network action to be taken in connection with the network element.

In still another form, a processor readable medium is provided for storing instructions that, when executed by a processor, cause the processor to: execute a web browser configured to communicate with a set of application program interfaces (APIs) that provide access to controllable data and control plane features of a network element that is configured to operate as a network router or a network switch; receive, by the web browser, a Hypertext Markup Language (HTML) document including HTML network service tags each including a command to cause a corresponding network action to be taken in connection with the network element; determine, by the web browser, based on each HTML network service tag the command to cause the network action to be taken in connection with the network element; and issue by the web browser the determined command for each HTML network service tag to a corresponding one of the APIs, which in turn cause the network action to be taken in connection with the network element.

Although the method, apparatus, and computer program product/processor readable medium are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
at a windowless web browser configured to execute on a controller on a network router or a network switch and to parse a Hypertext Markup Language (HTML) document, the web browser further configured to communicate with a set of application program interfaces (APIs) that provide access to controllable data and control plane features of the network router or the network switch:
receiving the HTML document including HTML network service tags each including a command to cause a corresponding network action to be taken in connection with the network router or the network switch;
parsing the HTML network service tags;
determining, based on the parsing, the command to cause the network action to be taken in connection with the network router or the network switch; and
issuing the determined command for each HTML network service tag to a corresponding one of the APIs, which in turn cause the network action to be taken in connection with the network router or the network switch.

2. The method of claim 1, wherein the determining includes:
accessing a device object model (DOM) that represents possible commands for network actions as different objects and defines hierarchical relationships between the different objects; and
interpreting each HTML network service tag based on the different objects and hierarchical relationships of the DOM.

3. The method of claim 2, wherein:
the receiving includes receiving an HTML network service tag including a connect command, a collect command, or a configuration command; and
the different objects of the DOM include objects that represent corresponding ones of:
the connect command to cause the web browser to issue a command to connect the web browser to the network router or the network switch;
the collect command to cause the web browser to issue a command to read information from the network router or the network switch, and which results in the read information being returned to the web browser; and
the configure command to cause the web browser to issue a command to configure the network router or the network switch.

4. The method of claim 3, wherein:
the determining includes deconstructing each of the commands into one or more primitive commands suitable for interpretation by corresponding ones of the APIs; and
the issuing includes sending each of the primitive commands to the corresponding ones of the APIs.

5. The method of claim 4, wherein:
the determining further includes deconstructing the connect command into a collection of primitive commands, including a node-type to identify a category of physical or virtual device, a connect-protocol to identify a connection protocol, a username to identify a source initiating a connection, and a password to validate the source of the connection; and the issuing includes sending each of the primitive commands from the connect command to corresponding ones of the APIs.

6. The method of claim 3, wherein:

the receiving includes receiving an HTML network service tag including an apply-configuration command, an upgrade command, a discover-network command, a create-network node command, a start-collaboration command, or a get-analytics-data command; and the different DOM objects further include objects that represent corresponding ones of:

the apply-configuration command to cause the web browser to issue a command to apply a configuration to the network router or the network switch;

an upgrade command to cause the web browser to issue a command to upgrade the network router or the network switch;

a discover-network command to cause the web browser to issue a command to discover the network router or the network switch;

a create-network node command to cause the web browser to issue a command to create a network node;

a start-collaboration command to cause the web browser to issue a command to start a collaboration with the network router or the network switch; and a get-analytics-data command to cause the web browser to issue a command to cause the network router or the network switch to send analytical data.

7. The method of claim 3, wherein the issuing a command to a corresponding one of the APIs includes sending the command to the API using a stateless protocol, and the method further comprises receiving at the web browser a response from the API using the stateless protocol.

8. The method of claim 1, wherein the HTML document and HTML network service tags are formatted according to the HTML5 standard.

9. The method of claim 1, wherein the HTML network service tags include respective HTML network service tag names formatted to include only alphanumeric characters.

10. An apparatus comprising:

a plurality of ports of a network router or a network switch, the plurality of ports configured to send and receive data packets over a network; and a processor of the network router or the network switch coupled to the plurality of ports and configured to:

execute a windowless web browser on the network router or the network switch, the web browser configured to parse a Hypertext Markup Language (HTML) document and communicate with a set of application program interfaces (APIs) that provide access to controllable data and control plane features of the network router or the network switch;

receive, by the web browser, the HTML document including HTML network service tags each including a command to cause a corresponding network action to be taken in connection with the network router or the network switch;

parse the HTML network service tags;

determine, by the web browser, based on the parsing, the command to cause the network action to be taken in connection with the network router or the network switch; and issue, by the web browser, the determined command for each HTML network service tag to a corresponding one of the APIs, which in turn cause the network action to be taken in connection with the network router or the network switch.

11. The apparatus of claim 10, wherein the processor is configured to determine by:

accessing a device object model (DOM) that represents possible commands for network actions as different objects and defines hierarchical relationships between the different objects; and interpreting each HTML network service tag based on the different objects and hierarchical relationships of the DOM.

12. The apparatus of claim 11, wherein:

the processor is configured to receive by receiving an HTML network service tag including a connect command, a collect command, or a configuration command; and the different objects of the DOM include objects that represent corresponding ones of:

the connect command to cause the web browser to issue a command to connect the web browser to the network router or the network switch;

the collect command to cause the web browser to issue a command to read information from the network router or the network switch, and which results in the read information being returned to the web browser; and the configure command to cause the web browser to issue a command to configure the network router or the network switch.

13. The apparatus of claim 12, wherein:

the processor is further configured to determine by deconstructing each of the commands into one or more primitive commands suitable for interpretation by corresponding ones of the APIs; and the processor is configured to issue by sending each of the primitive commands to the corresponding ones of the APIs.

14. The apparatus of claim 13, wherein:

the processor is further configured to determine by deconstructing the connect command into a collection of primitive commands, including a node-type to identify a category of physical or virtual device, a connect-protocol to identify a connection protocol, a username to identify a source initiating a connection, and a password to validate the source of the connection; and the processor is further configured to issue by sending each of the primitive commands from the connect command to corresponding ones of the APIs.

15. The apparatus of claim 12, wherein:

the processor is configured to receive by receiving an HTML network service tag including an apply-configuration command, an upgrade command, a discover-network command, a create-network node command, a start-collaboration command, or a get-analytics-data command; and the different DOM objects further include objects that represent corresponding ones of:

the apply-configuration command to cause the web browser to issue a command to apply a configuration to the network router or the network switch;

an upgrade command to cause the web browser to issue a command to upgrade the network element;

a discover-network command to cause the web browser to issue a command to discover the network router or the network switch;

a create-network node command to cause the web browser to issue a command to create a network node;

a start-collaboration command to cause the web browser to issue a command to start a collaboration with the network router or the network switch; and a get-analytics-data command to cause the web browser to issue a command to cause the network router or the network switch to send analytical data.

16. The apparatus of claim 10, wherein the HTML document and HTML network service tags are formatted according to the HTML5 standard.

17. A non-transitory computer readable storage medium storing instructions that, when executed by a processor of a network router of a network switch, cause the processor to:

execute a windowless web browser on the network router or the network switch, the web browser configured to parse a Hypertext Markup Language (HTML) document and communicate with a set of application program interfaces (APIs) that provide access to controllable data and control plane features of the network router or the network switch;

receive, by the web browser, the HTML document including HTML network service tags each including a command to cause a corresponding network action to be taken in connection with the network router or the network switch;

parse the HTML network service tags;

determine, by the web browser, based on each HTML network service tag the command to cause the network action to be taken in connection with the network router or the network switch; and issue by the web browser the determined command for each HTML network service tag to a corresponding one of the APIs, which in turn cause the network action to be taken in connection with the network router or the network switch.

18. The non-transitory computer readable storage medium of claim 17, wherein the instructions include instructions to cause the processor to:

access a device object model (DOM) that represents possible commands for network actions as different objects and defines hierarchical relationships between the different objects; and interpret each HTML network service tag based on the different objects and hierarchical relationships of the DOM.

19. The non-transitory computer readable storage medium of claim 18, wherein:

the instructions to cause the processor to receive including instructions to cause the processor to receive an HTML network service tag including a connect command, a collect command, or a configuration command; and the different objects of the DOM include objects that represent corresponding ones of:

the connect command to cause the web browser to issue a command to connect the web browser to the network router or the network switch;

the collect command to cause the web browser to issue a command to solicit information from the network router or the network switch; and the configure command to cause the web browser to issue a command to configure the network router or the network switch.

20. The non-transitory computer readable storage medium of claim 19, wherein the instructions further include instructions to cause the processor to:

deconstruct each of the commands into one or more primitive commands suitable for interpretation by corresponding ones of the APIs; and send each of the primitive commands to the corresponding ones of the APIs.

21. The non-transitory computer readable storage medium of claim 20, wherein the instructions further include instructions to cause the processor to:

deconstruct the connect command into a collection of primitive commands, including a node-type to identify a category of physical or virtual device, a connect-protocol to identify a connection protocol, a username to identify a source initiating a connection, and a password to validate the source of the connection; and send each of the primitive commands from the connect command to corresponding ones of the APIs.

22. The non-transitory computer readable storage medium of claim 19, wherein:

the instructions to cause the processor to receive include instructions to cause the processor to receive an HTML network service tag including an apply-configuration command, an upgrade command, a discover-network command, a create-network node command, a start-collaboration command, or a get-analytics-data command; and the different DOM objects further include objects that represent corresponding ones of:

the apply-configuration command to cause the web browser to issue a command to apply a configuration to the network router or the network switch;

an upgrade command to cause the web browser to issue a command to upgrade the network router or the network switch;

a discover-network command to cause the web browser to issue a command to discover the network router or the network switch;

a create-network node command to cause the web browser to issue a command to create a network node;

a start-collaboration command to cause the web browser to issue a command to start a collaboration with the network router or the network switch; and a get-analytics-data command to cause the web browser to issue a command to cause the network router or the network switch to send analytical data.

23. The non-transitory computer readable storage medium of claim 19, wherein the instructions further include instructions to cause the processor to send the command to the API using a stateless protocol, and receive at the web browser a response from the API using the stateless protocol.

* * * * *